United States Patent
Uemura et al.

(10) Patent No.: US 6,806,637 B2
(45) Date of Patent: *Oct. 19, 2004

(54) FLAT DISPLAY AND METHOD OF MOUNTING FIELD EMISSION TYPE ELECTRON-EMITTING SOURCE

(75) Inventors: Sashiro Uemura, Mie (JP); Junko Yotani, Mie (JP); Takeshi Nagasako, Mie (JP)

(73) Assignee: Noritake Co., Ltd., Aichi (JP)

( * ) Notice: Subject to any disclaimer, the term of this patent is extended or adjusted under 35 U.S.C. 154(b) by 252 days.

This patent is subject to a terminal disclaimer.

(21) Appl. No.: 09/900,078

(22) Filed: Jul. 6, 2001

(65) Prior Publication Data

US 2002/0003399 A1 Jan. 10, 2002

(30) Foreign Application Priority Data

Jul. 7, 2000 (JP) .................................. 2000-206355

(51) Int. Cl.⁷ .............................. H01J 1/62; H01J 63/04
(52) U.S. Cl. ...................... 313/495; 313/310; 313/311; 313/346 R
(58) Field of Search ................................ 313/495, 310, 313/311, 346 R, 309, 356, 351, 497, 236

(56) References Cited

U.S. PATENT DOCUMENTS

| | | | |
|---|---|---|---|
| 5,498,925 A | | 3/1996 | Bell et al. |
| 5,872,422 A | | 2/1999 | Xu et al. |
| 6,097,138 A | * | 8/2000 | Nakamoto ............... 313/309 |
| 6,250,984 B1 | * | 6/2001 | Jin et al. ................. 445/51 |
| 6,522,055 B2 | * | 2/2003 | Uemura et al. ............ 313/310 |
| 6,541,900 B1 | * | 4/2003 | Ando ..................... 313/495 |
| 6,624,566 B2 | * | 9/2003 | Uemura et al. ............ 313/496 |
| 2002/0021082 A1 | * | 2/2002 | Uemure et al. ............ 313/495 |

FOREIGN PATENT DOCUMENTS

| | | |
|---|---|---|
| EP | 0951047 A2 | 10/1999 |
| JP | 11-162383 | 6/1999 |
| JP | 11-194134 | 7/1999 |
| WO | WO 98/44526 | 10/1998 |

* cited by examiner

*Primary Examiner*—Ashok Patel
*Assistant Examiner*—Mariceli Santiago
(74) *Attorney, Agent, or Firm*—Blakely Sokoloff Taylor & Zafman

(57) ABSTRACT

A flat display includes a glass substrate, field emission type electron-emitting source, a front glass member, an electron extracting electrode, and a phosphor film. The electron-emitting source is mounted on the substrate. The front glass member opposes the substrate through a vacuum space and has light transmittance at least partially. The electron extracting electrode has an electron passing hole and is set away from the electron-emitting source to oppose the substrate. The phosphor film is formed on that surface of the front glass member which opposes the substrate. The electron-emitting source includes a plate-like metal member and a coating film. The plate-like metal member has a large number of through holes and serves as a growth nucleus for nanotube fibers. The coating film is formed of nanotubes that cover a surface of the metal member and inner walls of the through holes. A method of mounting a field emission type electron-emitting source is also disclosed.

8 Claims, 3 Drawing Sheets

FLAT DISPLAY AND METHOD OF MOUNTING FIELD EMISSION TYPE ELECTRON-EMITTING SOURCE

BACKGROUND OF THE INVENTION

The present invention relates to a flat display which emits light upon being bombarded on phosphors with electrons emitted from a field emission type electron-emitting source, and a method of mounting a field emission type electron-emitting source.

In recent years, in a flat panel (flat) display, e.g., an FED (Field Emission Display) or flat vacuum fluorescent display, which emits light when electrons emitted from an electron-emitting source are bombarded on its light-emitting portion comprised of phosphors formed on a counter electrode, one using carbon nanotubes in its electron-emitting source has been proposed. In a carbon nanotube, a graphite single layer is cylindrically closed, and a 5-membered ring is formed at the distal end of the cylinder. Since the carbon nanotube has a typical diameter of as very small as 10 nm to 50 nm, upon application of an electric field of about 100 V, it can field-emit electrons from its distal end.

Japanese Patent Laid-Open No. 11-162383 (reference 1) proposes a flat display using carbon nanotubes in its electron-emitting source of this type. Reference 1 describes an electron-emitting source in which needle-like columnar graphite members with a length of several $\mu$m to several mm and formed of a carbon nanotube assembly are fixed with a conductive adhesive, and an electron-emitting source formed by printing a paste mixed with columnar graphite members.

In these electron-emitting sources, a discontinuous portion such as a projection or recess is sometimes formed. If a parallel electric field is applied to obtain field electron emission, the electric field concentrates on the discontinuous portion to cause local electron emission. Local electron emission causes a luminance nonuniformity on a flat display using such an electron-emitting source.

SUMMARY OF THE INVENTION

It is an object of the present invention to provide a flat display with which a uniform luminance free from a luminance nonuniformity can be obtained and a method of mounting a field emission type electron-emitting source.

In order to achieve the above object, according to the present invention, there is provided a flat display comprising a substrate, a field emission type electron-emitting source mounted on the substrate, a front glass member opposing the substrate through a vacuum space and having light transmittance at least partially, an electron extracting electrode with an electron passing hole and set away from the electron-emitting source to oppose the substrate, and a phosphor film formed on a surface of the front glass member which opposes the substrate, the electron-emitting source comprising a plate-like metal member with a large number of through holes and serving as a growth nucleus for nanotube fibers, and a coating film formed of nanotubes that cover a surface of the metal member and inner walls of the through holes.

DESCRIPTION OF THE PREFERRED EMBODIMENT

The present invention will be described in detail with reference to the accompanying drawings.

Figure 1A:
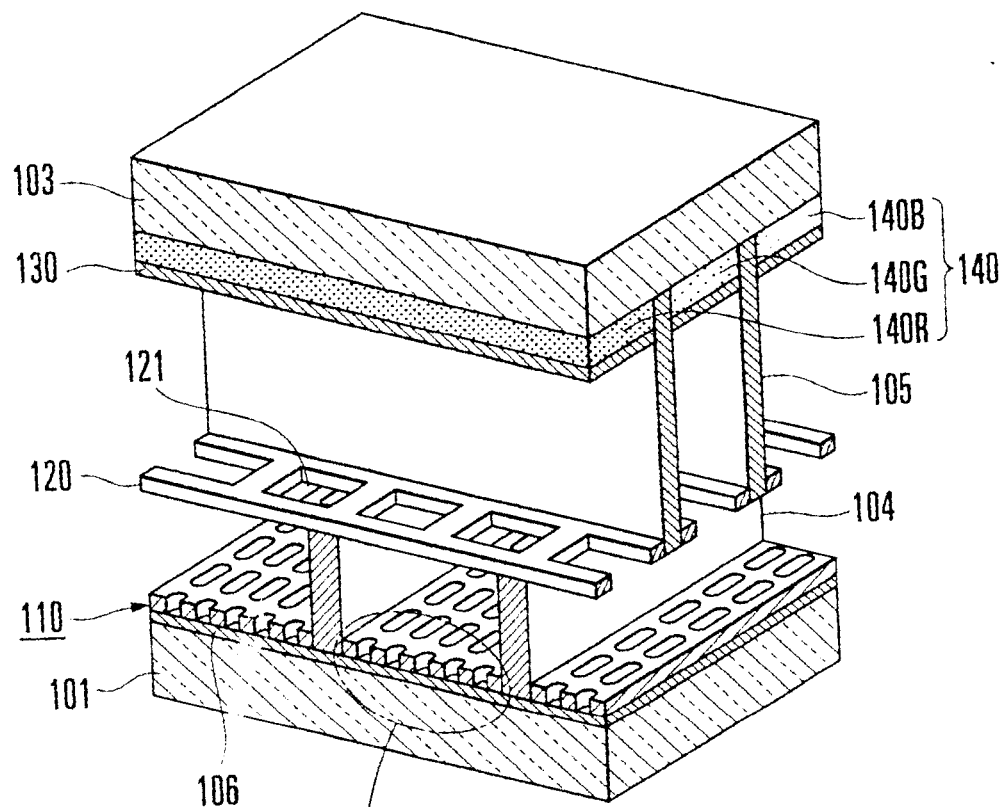
FIG. 1A is a perspective view of the main part of a flat display according to an embodiment of the present invention.

FIG. 1A shows a flat display according to an embodiment of the present invention. Referring to FIG. 1A, a plurality of substrate ribs 104 vertically stand on a glass substrate 101 to be parallel to each other at a predetermined interval, and a band-like field emission type electron-emitting source 110 is arranged on the glass substrate 101 sandwiched by the substrate ribs 104. The field emission type electron-emitting source 110 is fixed to the surface of the glass substrate 101 with an insulating paste 106 containing low-melting frit glass.

A transparent front glass member 103 is arranged to oppose the glass substrate 101, and a plurality of front surface ribs 105 vertically stand on that surface of the front glass member 103 which opposes the glass substrate 101, to be parallel to each other at a predetermined interval, such that they are perpendicular to the substrate ribs 104. The lower end faces of the front surface ribs 105 and the upper end faces of the substrate ribs 104 are in contact with each other at their intersecting portions. A phosphor film 140 is formed on that region of the surface of the front glass member 103 which is sandwiched by the front surface ribs 105, and a metal back film 130 serving as an anode is formed on the surface of the phosphor film 140.

A plurality of ladder-like electron extracting electrodes 120 opposing the metal back film 130 are supported on the upper end faces of the substrate ribs 104 to correspond to the respective regions defined by the front surface ribs 105. The glass substrate 101 and front glass member 103 oppose each other at a predetermined distance through a spacer glass frame (not shown), and their peripheries are adhered to the two surfaces of the spacer glass frame with low-melting frit glass. The interior of an envelope constituted by the glass substrate 101, front glass member 103, and spacer glass frame is held at a vacuum degree on the order of $10^{-5}$ Pa.

The glass substrate 101, front glass member 103, and spacer glass frame constituting the envelope are made of low-alkali soda-lime glass, and the glass substrate 101 and front glass member 103 use flat glass with a thickness of 1 mm to 2 mm. The substrate ribs 104 are made of an insulator formed by screen-printing an insulating paste containing low-melting frit glass repeatedly on the glass substrate 101 to a predetermined height, and calcining the printed insulating paste. In this case, each substrate rib 104 is formed to have a width of 50 $\mu$m and a height of 0.3 mm to 0.6 mm from the electron-emitting source 110. The rib interval is set such that the electron-emitting source 110 has a width of 0.3 mm.

The substrate rib 104 is not limited to the above arrangement, and its width suffices as far as it does not cause dielectric breakdown between the adjacent electron-emitting sources 110 and can stand the atmospheric pressure. The height of the substrate rib 104 is preferably small within a range not causing discharge between the electron-emitting source 110 and electron extracting electrode 120. The rib interval can also be changed when necessary.

Figure 1B:
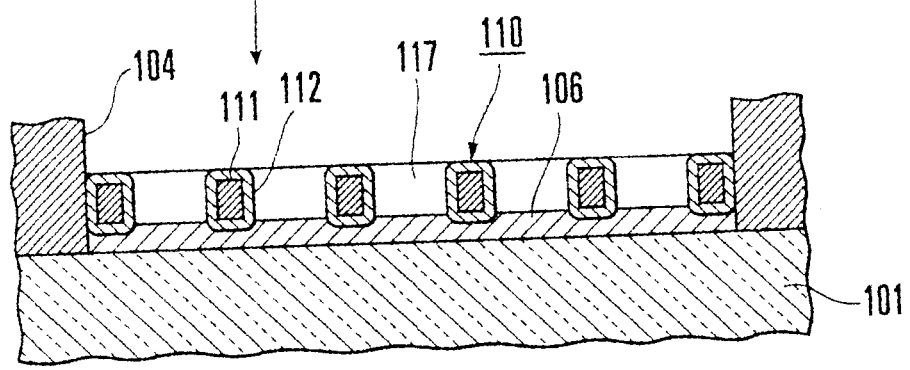
FIG. 1B is an enlarged sectional view of the electron-emitting source portion shown in FIG. 1A.

As shown in FIG. 1B, the electron-emitting source 110 is comprised of a plate-like metal member 111 with a large number of through holes 117 and serving as a growth nucleus for nanotube fibers, and a coating film 112 made of a large number of nanotube fibers that cover the surface of the plate-like metal member 111 and the inner walls of the through holes 117. The plate-like metal member 111 is a metal plate made of iron or an iron-containing alloy. The through holes 117 are formed in a matrix in the plate-like metal member 111 so the plate-like metal member 111 has a grid-like shape.

The openings of the through holes 117 may be of any shape as far as the coating film 112 is uniformly distributed on the plate-like metal member 111, and the sizes of the openings need not be the same. For example, the openings may be polygons such as triangles, quadrangles, or hexagons, those formed by rounding the corners of such polygons, or circles or ellipses. The sectional shape of the plate-like metal member 111 between the through holes is not limited to a square as shown in FIG. 1B, but may be any shape such as a circle or ellipse constituted by curves, a polygon such as a triangle, quadrangle, or hexagon, or those formed by rounding the corners of such polygons.

The nanotube fibers constituting the coating film 112 have thicknesses of about 10 nm or more and less than 1 $\mu$m and lengths of about 1 $\mu$m or more and less than 100 $\mu$m, and are made of a carbon fibrous material. The nanotube fibers suffice if they are single-layered carbon nanotubes in each of which a graphite single layer is cylindrically closed and a 5-membered ring is formed at the distal end of the cylinder. Alternatively, the nanotube fibers may be coaxial multilayered carbon nanotubes in each of which a plurality of graphite layers are multilayered to form a telescopic structure and are respectively cylindrically closed, hollow graphite tubes each with a disordered structure to produce a defect, or graphite tubes filled with carbon. Alternatively, the nanotubes may mixedly have these structures.

Each nanotube fiber described above has one end connected to the surface of the plate-like metal member 111 or the wall surface of the through hole, and the other end curled or entangled with other nanotube fibers to cover the metal portion constituting the grid, thereby forming the cotton-like coating film 112. In this case, the coating film 112 covers the plate-like metal member 111 with the thickness of 0.05 mm to 0.20 mm by a thickness of 10 $\mu$m to 30 $\mu$m to form a smooth curved surface.

The front surface ribs 105 are made of an insulator formed by screen-printing an insulating paste containing low-melting frit glass repeatedly at predetermined positions of the inner surface of the front glass member 103 to a predetermined height, and calcining the printed insulating paste. In this case, each front surface rib 105 is formed to have a width of 50 $\mu$m and a height of 2.0 mm to 4.0 mm between the electron extracting electrode 120 and metal back film 130. The rib interval is set such that the phosphor film at a region sandwiched by the front surface ribs 105 has a width of 0.3 mm.

The front surface rib 105 is not limited to the above arrangement, and its width suffices as far as it does not cause dielectric breakdown between the adjacent metal back films 130 or electron extracting electrodes 120 and can stand the atmospheric pressure. The height of the front surface rib 105 can be changed in accordance with the voltage to be applied to the metal back film 130. The rib interval can also be changed when necessary.

A phosphor film 140 is made up of a plurality of phosphors with predetermined emission colors, and is formed by screen-printing a phosphor paste of each color in a stripe on the inner surface of the front glass member 103, and calcining the printed stripe to have a thickness of 10 $\mu$m to 100 $\mu$m and a width of 0.3 mm. The phosphor film 140 is comprised of a red-emitting phosphor film 140R using a red-emitting phosphor used to display red (R), green-emitting phosphor film 140G using a green-emitting phosphor used to display green (G), and blue-emitting phosphor film 140B using a blue-emitting phosphor used to display blue (B). The phosphor film 140 is repeatedly arranged in the order of the red-emitting phosphor film 140R, green-emitting phosphor film 140G, and blue-emitting phosphor film 140B in the regions defined by the front surface ribs 105.

As the respective phosphor films 140R, 140G, and 140B for R, G, and B, known oxide phosphors or sulfide phosphors which are generally used in a cathode-ray tube or the like and emit light upon being bombarded with electrons accelerated by a high voltage of 4 kV to 10 kV can be used. Although three types of phosphor films are used for emitting three primary colors of R, G, and B in color display, the present invention is not limited to this, and a phosphor film of one type may be used for monochrome display. The metal back film 130 is formed of an aluminum thin film with a thickness of about 0.1 $\mu$m, and is formed on the surface of the phosphor film by using a known vapor deposition method.

The electron extracting electrodes 120 are made of a 50-$\mu$m thick stainless steel plate or a 42-6 alloy plate, and have ladder-like shapes with rectangular electron passing holes 121 formed by etching. Of each electron extracting electrode 120, the width is fitted between the front surface ribs 105, and the side piece portion is arranged on the substrate ribs 104 and above the center line of the electron-emitting source 110. The electron passing holes 121 are not limited to have rectangular shapes, but may have other shapes, i.e., they may constitute a mesh structure, or may be a large number of circular openings with a diameter of 20 $\mu$m to 100 $\mu$M.

A method of manufacturing a flat display described above, which includes the step of adhering the electron-emitting sources 110 to the glass substrate 101, will be described with reference to FIGS. 2A, 2B, 3A, and 3B.

[Formation of Electron-Emitting Source]

Figure 2A:
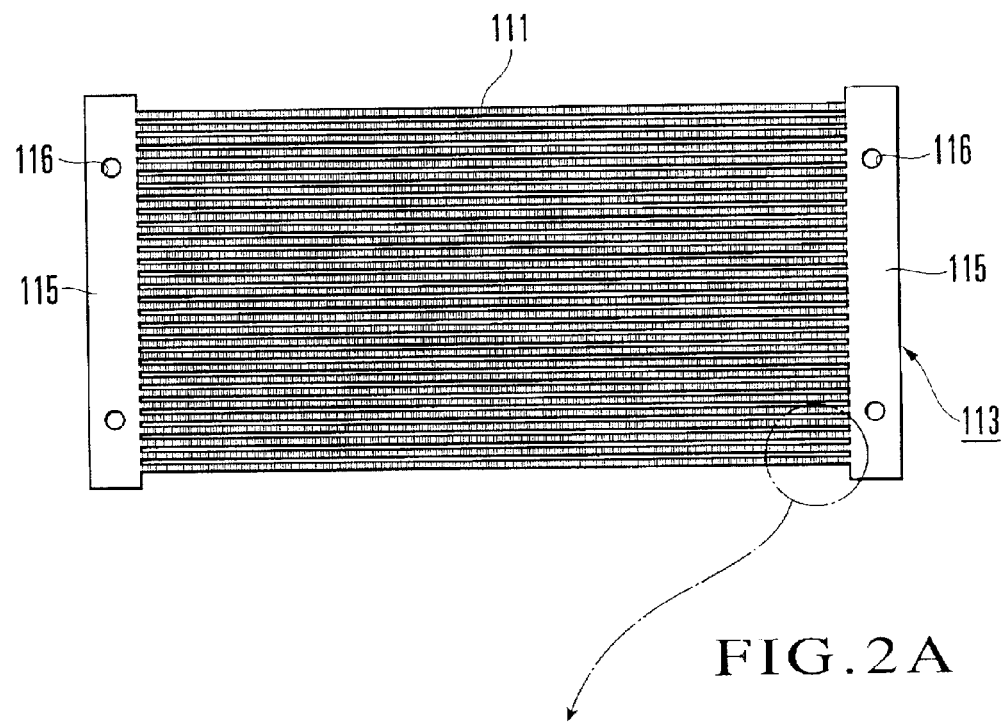
FIG. 2A is a plan view of a metal substrate showing a manufacturing process for the electron-emitting source shown in FIG. 1A.
Figure 2B:
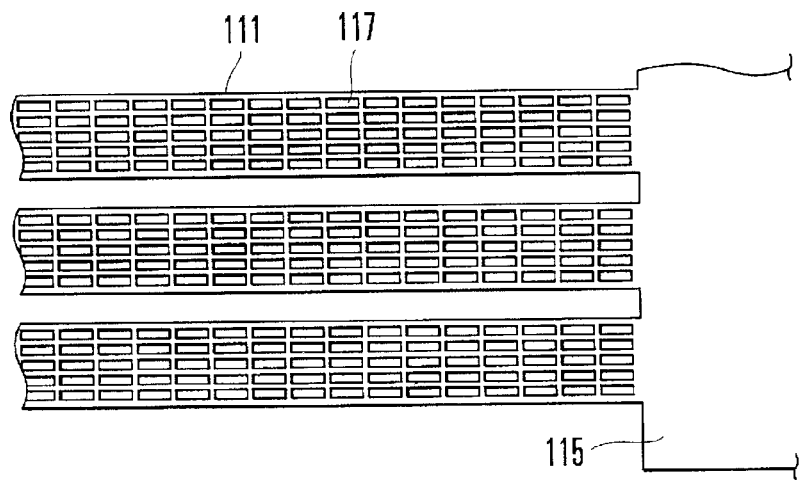
FIG. 2B is an enlarged plan view of the metal member shown in FIG. 2A.

First, as shown in FIG. 2A, a metal substrate 113, integrally having the plurality of band-like plate-like metal members 111 with the large number of through holes 117 and arranged parallel to each other at a predetermined interval and a pair of holding members 115 opposing each other through the band-like plate-like metal members 111 and for holding the two ends of each band-like plate-like metal member 111, is fabricated. The pair of holding members 115 have two sets of mounting through holes 116 at opposing positions. As shown in FIG. 2B, each plate-like metal member 111 has the through holes 117 formed in a matrix, so it has a grid-like shape.

In fabrication of the metal substrate 113, a photosensitive resist film formed on a metal plate made of iron or an iron-containing alloy is exposed with light or ultraviolet rays by using a mask with a pattern for forming the plate-like metal members 111 with the large number of through holes 117 and the holding members 115 integrally, and developed, thereby forming a resist film with a desired pattern. Then, the metal plate is dipped in an etching solution to remove an unnecessary portion of it where no resist film is formed.

After that, the resist film is removed and the resultant structure is washed, thus obtaining the metal substrate 113.

In this case, the through holes 117 may be formed into arbitrary shapes by the mask pattern. If a pattern is formed on the resist film on one surface of the metal plate while leaving the resist film on the other surface intact, the sectional shape of the metal portion between the adjacent through holes and constituting the grid becomes trapezoidal or triangular. If patterns are formed on the resist films on the two surfaces, the sectional shape becomes hexagonal or rhombic. The sectional shape can be changed in this manner in accordance with the manufacturing methods and manufacturing conditions. After etching, if electropolishing is performed, a curved sectional shape can be obtained.

Iron or an iron-containing alloy is used as the material of the metal substrate 113, because iron serves as a growth nucleus for the nanotube fibers made of carbon. When iron is selected as the material of the metal substrate 113, industrial pure iron (Fe with a purity of 99.96%) is used. This purity is not specifically necessary, and may be, e.g., 97% or 99.9%. As the iron-containing alloy, for example, a 42 alloy (42% Ni) or 42-6 alloy (42% Ni and 6% Cr) can be used. However, the present invention is not limited to them. In this embodiment, a 42-6 alloy thin plate with a thickness of 0.05 mm to 0.20 mm was used considering the manufacturing cost and availability.

Subsequently, the coating film 112 formed of carbon nanotube fibers is formed on the metal substrate 113 by thermal CVD (Chemical Vapor Deposition). More specifically, the metal substrate 113 is loaded in a reaction vessel, and the interior of the reaction vessel is evacuated to vacuum. Then, methane gas and hydrogen gas, or carbon monoxide gas and hydrogen gas are introduced into the reaction vessel at a predetermined ratio to maintain the interior of the reaction vessel at 1 atm. In this atmosphere, the metal substrate 113 is heated by an infrared lamp for a predetermined period of time to grow the carbon nanotube fiber coating film 112 on the surface of the metal surface 113 and the inner walls of the through holes 117 constituting the grid. When thermal CVD is used, carbon nanotube fibers which constitute the coating film 112 can be formed in a curled state.

[Mounting of Electron-Emitting Source]

The insulating paste 106 for adhering the electron-emitting source 110 is applied to the glass substrate 101 constituting the envelope. More specifically, the insulating paste 106 containing low-melting frit glass is screen-printed on that region on the glass substrate 101 where the electron-emitting source 110 is to be arranged. The insulating paste containing low-melting frit glass is screen-printed on those regions on the glass substrate 101 where the substrate ribs 104 are to be arranged repeatedly to a predetermined height. The glass substrate 101 is calcinated by heating it in air to 400° C., thereby removing a binder contained in the paste.

Figure 3A:
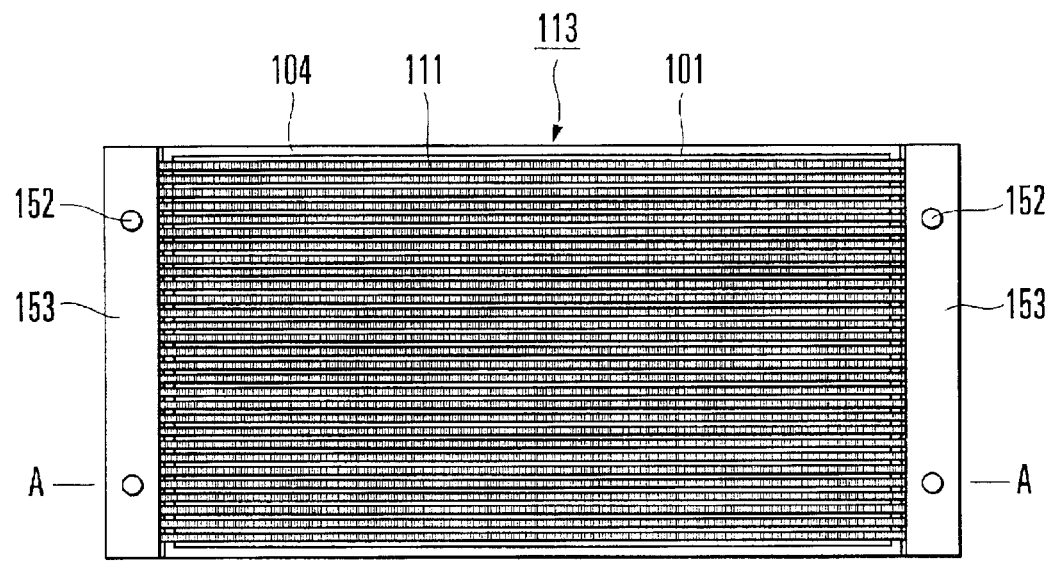
FIGS. 3A and 3B are a plan and sectional views, respectively, showing a state wherein the electron-emitting source shown in FIG. 1A is attached to a glass substrate by using metal substrate fixing jigs.
Figure 3B:
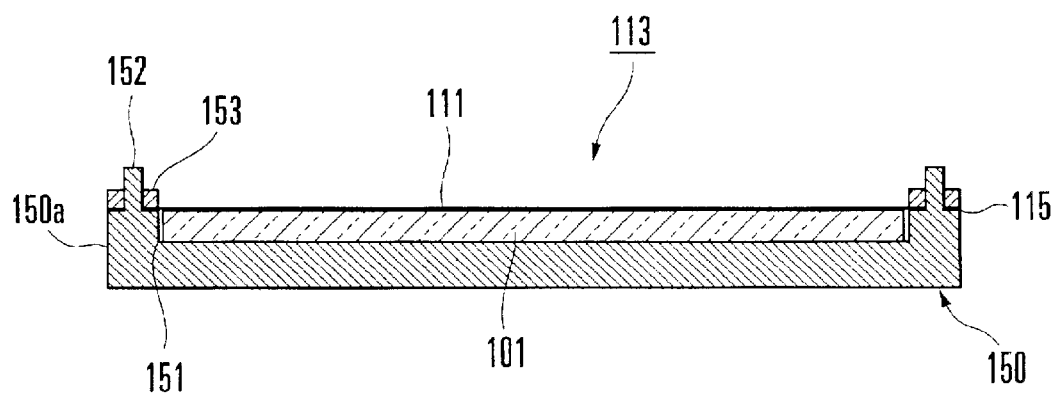

As shown in FIG. 3B, the metal substrate 113 formed with the coating films 112 is placed on the calcinated glass substrate 101 by using a metal attaching jig 150. The metal attaching jig 150 has a groove 151 with a depth almost equal to the thickness of the glass substrate 101, so it can accommodate the glass substrate 101. Two sets of projections 152 are formed on ridges 150a, which oppose each other through the groove 151, to correspond to the through holes 116 formed in the holding members 115 for the metal substrate 113.

As shown in FIG. 3B, the calcinated glass substrate 101 is accommodated in the groove 151 of the metal attaching jig 150, and the through holes 116 of the holding members 115 are engaged with the projections 152 of the metal attaching jig 150, thereby placing the metal substrate 113 with the coating film 112 on the glass substrate 101. Subsequently, the holding members 115 are urged against the upper surfaces of the ridges 150a of the metal attaching jig 150 with a pair of strip-like retaining jigs 153 mounted on the two sides of the groove 151, thereby fixing the metal substrate 113. The glass substrate 101 and projections 152 are arranged such that, when the through holes 116 of the holding members 115 for the metal substrate 113 are engaged with the corresponding projections 152, the metal member 111 with the coating film 112 and serving as the electron-emitting source 110 coincides with the region printed with the insulating paste 106 for adhering the electron-emitting source 110.

The metal attaching jig 150 on which the glass substrate 101 and metal substrate 113 are mounted is heated in a nitrogen atmosphere or an air atmosphere with a reduced oxygen partial pressure to 400° C. to 600° C. Then, frit glass contained in the insulating paste 106 is fused, so the metal member 111 with the coating film 112 is fixed partially buried in the insulating paste 106. If the insulating paste 106 is thin, that portion of the coating film 112 formed on the plate-like metal member 111 which is to be adhered to the insulating paste 106 may be removed in advance.

Stainless steel as the material of the metal attaching jig 150 has a larger coefficient of thermal expansion than that of low-alkali soda lime glass as the material of the glass substrate 101 or that of the 42-6 alloy as the material of the metal substrate 113. When heating is performed at 400° C. to 600° C., the metal attaching jig 150 is expanded to be larger than the metal substrate 113, and accordingly the metal substrate 113 is adhered with a tensile force being applied to it. When the temperature is restored to room temperature, a contraction force is generated in the plate-like metal member 111 adhered to the glass substrate 101 and with the coating film 112.

The glass substrate 101 is removed from the metal attaching jig 150, and the holding members 115 are separated from the metal substrate 113 adhered to the glass substrate 101. In this manner, the glass substrate 101 adhered to cause the contraction force and with the electron-emitting source 110 is obtained.

In the above embodiment, the substrate ribs 104 are formed by printing on the glass substrate 101 before the plate-like metal member 111 is adhered to it. If the substrate ribs 104 are not used, only the insulating paste 106 for adhering the electron-emitting sources 110 may be printed on the glass substrate 101. The insulating paste 106 containing low-melting frit glass is used as the adhesive. However, the present invention is not limited to this, and a conductive paste such as a silver paste may be used instead as far as it is an adhesive containing frit glass. The method of fixing the electron-emitting source 110 to the glass substrate 101 is not limited to fixing the whole electron-emitting source 110 with the adhesive, but the electron-emitting source 110 may be fixed with the adhesive partly, e.g., at only its two ends.

The operation of the flat display manufactured in the above manner will be described.

In the flat display according to this embodiment, a DC power supply voltage is applied between the electron extracting electrode 120 and electron-emitting source 110 such that the electron extracting electrode 120 is at the positive potential. Hence, an electric field is uniformly applied to the nanotube fibers (coating films 112) of the electron-emitting source 110 corresponding to the intersecting portion of the electron extracting electrode 120 and electron-emitting source 110, to extract electrons from the nanotube fibers. The extracted electrons are emitted from the electron passing holes 121 of the electron extracting electrode 120. At this time, when a positive voltage (accelerating voltage) is applied to the metal back film 130, the electrons emitted from the electron passing holes 121 are accelerated toward the metal back film 130. The accelerated electrons are transmitted through the metal back film 130 and bombard against the phosphor film 140, causing it to emit light.

The electron extracting electrodes 120 and electron-emitting sources 110 are formed in predetermined numbers in rows and columns, respectively. With a positive voltage (accelerating voltage) being applied to the metal back film 130, a predetermined positive voltage is applied to the electron extracting electrodes 120 on the active row, and a predetermined negative voltage is applied to the electron-emitting sources 110 on the column corresponding to those pixels on the active row which are to emit light. This operation is sequentially performed for the electron extracting electrodes 120 on the first row until those on a predetermined row, so that dot matrix display can be performed. The electron-emitting sources 110 to which the negative voltage is not applied and those of the electron extracting electrodes 120 which are on the rows other than the active row are set to 0 V.

According to this embodiment, the nanotube fibers serving as the electron emitting-source cover the surface of the plate-like metal member 111 and the inner walls of the through holes 117 to form the coating film 112 with smooth surfaces. The electric field is thus uniformly applied to the surface, so the field emission electrons are emitted not locally but uniformly. As a result, uniform field electron emission can be obtained, and a uniform luminance can be obtained on the entire screen.

Since a contraction force constantly acts on the electron-emitting source 110, the electron-emitting source 110 does not deform by thermal expansion, and fluctuations in distance between the electron-emitting source 110 and electron extracting electrode 120 can be suppressed. This prevents fluctuations in luminance, thus obtaining a uniform luminance. Since the electron-emitting sources 110 are adhered to the glass substrate 101 by their entire lengths, vibration of the electron-emitting sources 110 caused during driving is suppressed, thus preventing noise.

The present invention is not limited to the above embodiment, but can be applied to any type as far as it is a flat display used by adhering, to a substrate, a field emission type electron-emitting source comprising a plate-like metal member with a large number of through holes and serving as a growth nucleus for nanotube fibers and a coating film formed of nanotube fibers that cover the surface of the metal member and the walls of the through holes. The present invention can be modified in various manners, e.g., a flat display of a type in which glass or ceramic spacers are used as the substrate ribs or front surface ribs, a type which has no substrate ribs or front surface ribs but in which two spacer glass members are stacked and electron extracting electrodes are sandwiched and fixed between the spacer glass members, and a type which has no substrate ribs or front surface ribs but in which a metal back film also serves as an electron extracting electrode, can be formed.

As has been described above, according to the flat display of the present invention, since field emission electrons are emitted not locally but uniformly, a uniform luminance free from a luminance nonuniformity can be obtained. Also, fluctuations in distance between the electron-emitting source and the electron extracting electrode, which is caused by thermal expansion, is suppressed, thereby preventing fluctuations in luminance.

What is claimed is:

1. A flat display comprising:
   a substrate;
   a field emission type electron-emitting source mounted on said substrate;
   a front glass member opposing said substrate through a vacuum space and having light transmittance at least partially;
   an electron extracting electrode with an electron passing hole and set away from said electron-emitting source to oppose said substrate; and
   a phosphor film formed on a surface of said front glass member which opposes said substrate,
   said electron-emitting source comprising
   a plate-like metal member with a large number of through holes and serving as a growth nucleus for nanotube fibers, and
   a coating film formed of nanotubes that cover a surface of said metal member and inner walls of the through holes.

2. A display according to claim 1, wherein
   said electron-emitting source comprises a plurality of band-like electron-emitting sources arranged parallel to each other,
   said electron extracting electrode comprises a plurality of band-like extracting electrodes arranged in a direction perpendicular to said band-like electron-emitting sources, and
   said phosphor film comprises a plurality of band-like phosphor films arranged to oppose said band-like extracting electrodes.

3. A display according to claim 2, wherein
   said display further comprises a plurality of support ribs vertically standing on said substrate at a predetermined interval,
   said band-like electron-emitting sources are arranged among said support ribs, and
   said band-like electron extracting electrodes are supported on said support ribs.

4. A display according to claim 1, wherein said electron-emitting source is fixed to said substrate with an adhesive containing frit glass.

5. A display according to claim 1, wherein
   said metal member of said electron-emitting source is made of one of iron and an iron-containing alloy, and
   the nanotubes constituting said coating film are made of carbon and adapted to cover said metal member in a curled state.

6. A display according to claim 5, wherein the nanotube fibers constituting said coating film are fibers each with a thickness of not less than 10 nm and less than 1 $\mu$m and a length of not less than 1 $\mu$m and less than 100 $\mu$m.

7. A display according to claim 5, wherein
   said metal member has a thickness of 0.05 mm to 0.20 mm, and
   said coating film covers the surface of said metal member and the inner walls of the through holes to a thickness of 10 $\mu$m to 30 $\mu$m to form a smooth curved surface.

8. A display according to claim 1, wherein said metal member has the through holes in a matrix shape to form a grid.

* * * * *